United States Patent Office 3,530,235
Patented Sept. 22, 1970

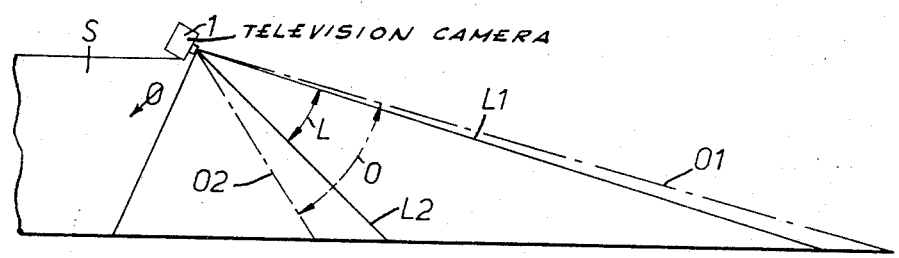
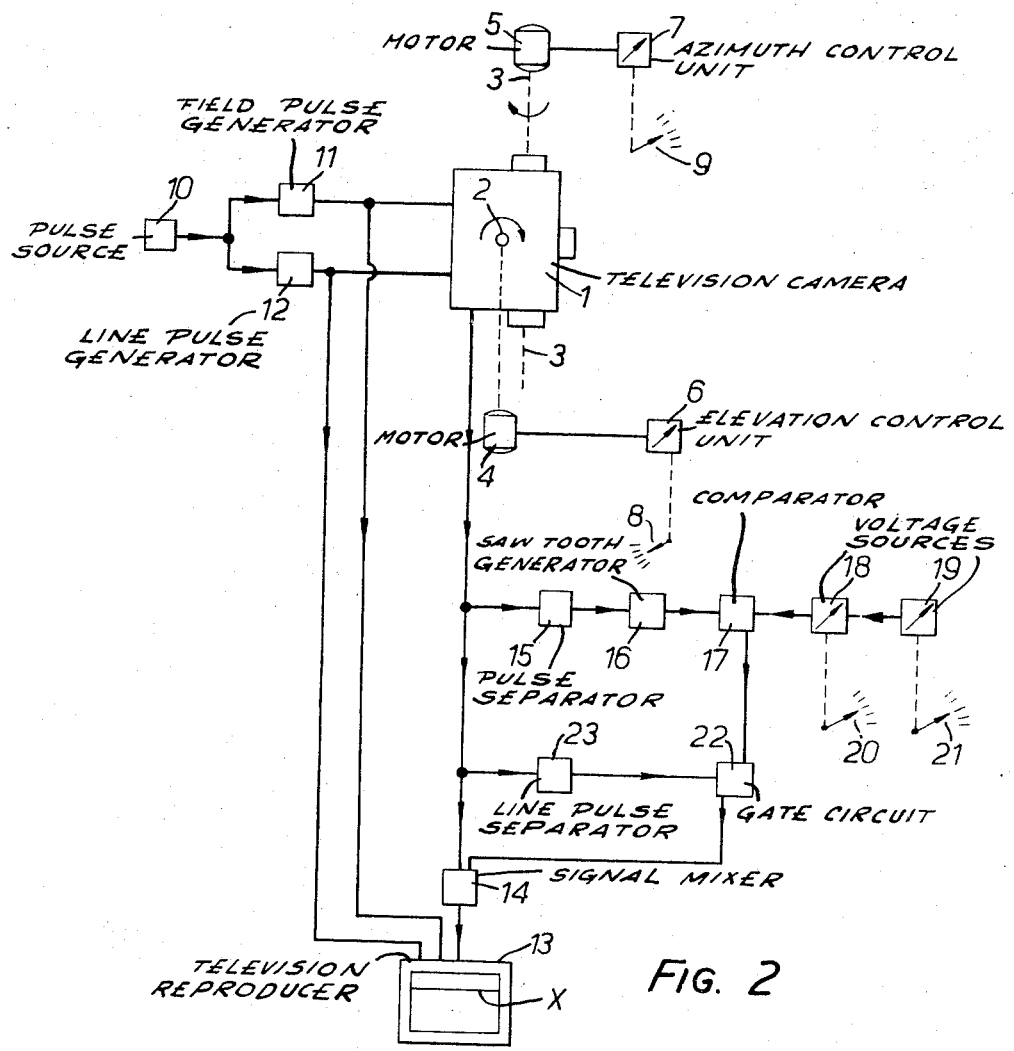

3,530,235
RANGE AND BEARING MEASURING APPARATUS
Ramon Bolton, Great Baddow, England, assignor to The Marconi International Marine Company Limited, Chelmsford, Essex, England, a British company
Filed June 30, 1967, Ser. No. 650,362
Claims priority, application Great Britain, July 4, 1966, 29,860/66
Int. Cl. H04n 7/02
U.S. Cl. 178—6.8          10 Claims

ABSTRACT OF THE DISCLOSURE

A closed circuit television apparatus for determining range and bearing which is particularly adapted for use in blind navigation of ships is described. The apparatus includes a television camera and a television reproducer. Means are provided for swinging the camera, which is mounted on the bow of a ship, in azimuth with a given angular relationship with a horizontal plane to provide bearing data. Means are provided for developing a movable cursor line which appears horizontally across the screen of a television reproducer superimposed on the image thereon viewed by the camera. The image on the screen, from top to bottom, corresponds to pre-determined distances from the ship. Control means, responsive in part to a saw-tooth wave corresponding to a field scan, is provided for moving the cursor line by a manual control in order to bring the cursor line into alignment with an image appearing in the centre of the screen. The manual control is associated with an indicator on which a range index is provided. Additional controls are provided for compensating for varying attitude and varying draft of the ship.

---

This invention relates to range and bearing measuring apparatus. The primary intended application of the invention is to the obtaining of range and bearing of objects for the purpose of ship-handling in restricted conditions e.g. in docking or coming alongside but, as will be apparent later, the invention is not limited to this particular application but may be used in other cases, for example for obtaining the distance and bearing of objects in certain industrial processes or in sub-aqueous searching and in other cases where ordinary direct visual methods of distance and bearing measurement are, for some reason or another, impractical or inconvenient. Although, as stated, the invention is of wider application than to the facilitation of ship-handling, it will be described, hereinafter, as for that application.

The development of long ships, especially large tankers, with their navigation bridges aft, has produced difficult problems in ship handling when coming alongside, docking, and executing other similar manoeuvres, because of the great length of vessel which is forward of the bridge and obscures the view ahead of the conning officer. Tankers of a length of around 1000 feet are coming increasingly into use and it will be appreciated that, in such a vessel with her bridge aft, there will be a very considerable distance ahead of the ship hidden from the conning officer by the ship herself. This problem has been met to some extent by mounting a television camera more or less on the stem head and incorporating it in a closed circuit television system which also includes a television reproducer on the bridge. In this way the conning officer is provided, on the bridge, with an unobstructed television picture of the view ahead of the ship. This expedient is, however, only a partial solution of the ship handling problem for it is difficult to interpret the reproduced picture so as to derive therefrom the information which is really wanted for ship handling purposes. What is really wanted in addition to a mere unobstructed picture of the view ahead is a ready means of ascertaining the range and bearing of a particular object e.g. a quayside, in the picture. The present invention satisfies this need.

According to this invention in its broadest aspect apparatus for ascertaining at least the range of an object comprises a television camera positioned and arranged to "view" a scene which includes said object, a television reproducer included with said camera in a closed circuit television system and adapted to reproduce said scene in a picture the height dimension of which corresponds to a vertical angle of view of pre-determined value, a cursor line extending across the reproduced picture at right angles to said height dimension and manually movable in relation to the reproduced picture along said height dimension, means for swinging said camera in azimuth, and means, actuated in dependence upon the relative movement along the height direction between the cursor line and the reproduced picture, for indicating the range of an object which appears in the picture and has been brought into co-incidence with said cursor line at a pre-determined point along its length.

Preferably the cursor line is movable manually in relation to the reproduced picture along said height dimension by two controls at least one of which is a manual control and also actuates range indicating means and the second of which provides an additional compensating adjustment varying the relative position of said cursor line to said reproduced picture for a given setting of said one control. Preferably both these controls are manual.

Preferably the means for swinging the camera in azimuth is provided with a scale reading directly the horizontal angle between the direction in which the camera is "pointed" and the heading direction of a structure (e.g. a ship) from which the camera is carried whereby when an object in the reproduced picture has been brought into coincidence with a particular point along the cursor line, the reading of said scale gives the relative bearing of said object with respect to said heading direction.

Preferably also means are provided for swinging the camera in elevation and a scale is provided in association with said means for indicating the angle in the vertical plane between the direction in which the camera is pointed and a datum elevation, with reference to the horizontal, of a structure (e.g. a ship) from which the camera is carried.

Preferably the cursor line is an electronically produced line forming part of the reproduced picture. A preferred way of producing such an electronically produced cursor line comprises means for producing, during each television scanning line, a saw tooth voltage wave excursion, means for producing a variable D.C. voltage, and means for brightening up one scanning line of the reproduced picture when the saw tooth voltage equals the adjusted value of the variable D.C. voltage.

Preferably the variable D.C. voltage is the sum of two separately variable component D.C. voltages one of which is controlled by a first manual control which also actuates the range indicating means and the other of which provides an additional compensating voltage varying the position in the reproduced picture of the brightened up television line obtained at any given setting of said first manual control. Preferably the saw tooth voltage wave and the variable D.C. voltage are applied as inputs to a comparator the output from which, obtained when said inputs are equal, is applied as brighten-up voltage to the reproducer tube in the picture reproducer through a gate which is closed by television line pulses and opened between successive line pulses whereby said output, when it occurs, brightens up one television line in the reproduced picture at a height therein determined by said D.C. voltage.

A preferred ship-board equipment in accordance with this invention comprises a television camera mounted forward in the ship to "view" forwardly and in a downwardly inclined direction; means for swinging said camera in azimuth; a control for said means; a scale indicator indicating the angle in azimuth between the azimuth direction in which said camera is pointed and ship's head; second means for swinging said camera in elevation; a control for said second means; a second scale indicating the angle in elevation between the direction in which said camera is pointed and a pre-determined "normal" fore-and-aft angle of trim of the ship; a closed circuit television system including said camera and a television reproducer synchronously operated therewith; means for separating field pulses from the output from the camera; means for producing, from the separated field pulses, saw tooth voltage excursions each occupying substantially one field period; a comparator fed as to one input by the saw tooth excursions; a manually variable D.C. voltage source the control for which also operates a scale marked in range; a second manually variable D.C. voltage source the control for which also operates a scale marked in ship's draft forward relative to a predetermined "normal" draft forward; means for applying the sum of the two variable D.C. voltages as the second input to the comparator; a gate fed with output from said comparator; means for separating line pulses from the output from the camera and utilising said separated line pulses to close said gate when said pulses occur and open it between pulses; a signal mixer fed with output from the camera and output passed by said gate; and means for feeding the mixed output from the mixer to the television reproducer.

The invention is illustrated in and further explained in connection with the accompanying drawings in which FIG. 1 is an explanatory diagram and FIG. 2 is a block diagram of a preferred embodiment of the invention.

Referring to the drawings and first to FIG. 1, S represents a ship in the forepart of which, is mounted near the stem, a television camera which "points" forward and downwards. The angle 0 between the broken line 01, 02, represents, by way of example only, the angle in the vertical plane covered by the optical lens system (not separately shown) of the camera, when it is inclined downwards by a certain angle, and the smaller angle L between the full lines L1, L2, represents the vertical angle which corresponds to the height dimension (the distance between the top and bottom) of a television picture produced on the viewing cathode ray tube of a television reproducer (not shown in FIG. 1) reproducing pictures from signals supplied to it by the camera 1. If the height of the camera above the water line is known the range of any object appearing in the picture and which is dead ahead with respect to the camera can be calculated trigonometrically since it will depend upon that height and upon the angle of downward inclination from the camera to the object. Thus, to quote practical figures by way of example, what may be termed the effective vertical acceptance angle of the camera i.e. the angle, in the vertical plane, which corresponds to the height dimension of the reproduced picture, might be 20° and the height of the camera above the water line might be 30'. Then, with the camera as in FIG. 1, and inclined downwards so that the line L2 is at 65° to the vertical and the line L3 is at 85° to the vertical, the ranges of objects which are dead ahead with respect to the camera and appear in the extreme bottom and top edges of the reproduced picture respectively will be (to the nearest foot) 64 ft. (30 tan 65°) and 343 ft. (30 tan 85°) respectively. Further it will be apparent that the range of any object which is dead ahead with respect to the camera and which appears somewhere between the top and bottom of the reproduced picture, can be ascertained trigonometrically in similar fashion since it will be given by the expression $H \tan A$ where H is the height of the camera and A is the angle, in the vertical plane, between the vertical and a line from the camera to the object in question. Clearly, however, correct ascertainment of the range of an object from where it appears, in the reproduced picture, between the top and bottom edges of the reproduced picture depends upon the actual height H being that assumed in the expression $H \tan A$, i.e. variation of the forward draft of the ship will affect the accuracy of ascertainment of range; upon the fore-and-aft trim of the ship being known i.e. variation of fore-and-aft trim between "bow up" and "bow down" conditions will also affect the accuracy of ascertainment of range; and upon the object being dead ahead as viewed by the camera for obviously if an object is to one side of the dead ahead "line of sight" of the camera its range will be greater than that of an object which appears in the same horizontal line in the reproduced picture but is in fact dead ahead with respect to the camera. The embodiment now to be described and which is illustrated in FIG. 2 enables the range of an object to be ascertained directly with good accuracy despite variations in forward draft, and variations in fore-and-aft trim, and whether or not it is dead ahead with respect to the camera. The embodiment also enables the relative bearing of any object in the reproduced picture to be ascertained. The practical value, to ship handling—for example in docking—of being able to ascertain, quickly and accurately, the range and relative bearing of any object in the reproduced picture under all practical conditions, even though that object may be invisible to an officer on a bridge situated aft, needs no emphasis.

Referring now to FIG. 2, the camera 1 is mounted on the ship in such manner that it may be swung in elevation, i.e. about a horizontal axis 2 or in azimuth i.e. about a vertical axis 3, with respect to the ship. Training in elevation is effected by an elevation training motor 4 and training in azimuth by an azimuth training motor 5. The motors 4 and 5 are controlled by any suitable manually operable elevation and azimuth control units 6 and 7 respectively, as known per se and in association with each of these is provided an indicator and scale arrangement, 8 or 9, to indicate the setting of the camera, in elevation or azimuth, with relation to the ship. The control units 6 and 7 and indicators 8 and 9 are shown purely schematically and may be situated in any convenient position (normally on the bridge) and take any convenient known forms.

A main pulse source 10 drives television field and line pulse generators 11 and 12 in accordance with well known closed circuit television practice to produce a desired television raster e.g. an interlaced raster, in the camera 1. The field and line synchronising signals from 11 and 12 are also used to produce a similar raster in a television reproducer 13 synchronously operated with the camera 1. The complex television signal output waveform from the camera 1 is of the customary closed circuit television form and is fed to a signal mixer or combiner 14 of any convenient known form. Field pulses in the television wave form from the camera 1 are separated by a known pulse separator 15 the output from which drives a saw tooth generator 16. This generator is of known form, e.g. it could be a Miller circuit, which produces a linear saw tooth rising from a minimum to a maximum value during the interval between two field pulses. This saw tooth is applied as one input to a known comparator 17. The second input to the comparator is the sum of two voltages supplied from two manually adjustable D.C. voltage sources 18 and 19 with the adjustment handles of which are associated indicators and scales 20 and 21 respectively. When the saw tooth voltage input from the saw tooth source 16 to the comparator 17 reaches equality with the second input to said comparator, the latter provides an output to a gate 22. Line pulses in the output from the camera 1 are separated by a line pulse separator 23 and fed to the gate 22 to close the same during said pulses and open it between pulses. The arrangement of the comparator and line controlled gate 22 is such that, when the two inputs to the comparator are equal, the gate 22 passes a signal, which is one television scanning line long, to the mixer or combiner 14, the gate 22 ensuring that the signal passed is of the stated duration of one line. The combiner or mixer 14 combines the signals from the camera 1 and from the gate 22 and feeds the resultant to the reproducer 13 the reproducer tube in which displays the scene viewed from the camera with a brightened horizontal line X (due to the signal passed by the gate 22) across it. By adjusting the source 18 the position of the line X can be moved across the picture from top to bottom and a small additional measure of adjustment of the position of this line up or down in the picture can be obtained by adjusting the source 19 to calibrate the position of the cursor line by taking into account the actual draft of the ship as it differs from the reference draft. A vertical line (not shown) serving as an azimuth marker, may be provided across the face of the reproducer tube in the reproducer 13, this line being centrally positioned. The scale 20 is calibrated to read directly in range and, by suitably choosing the law of variation of the source 18, may be made a linear, or an approximately linear, scale. The scale 8 is calibrated to read directly in angles of fore-and-aft ship trim above and below a "normal" trim angle; the scale 21 is calibrated to read directly ship's draft forward, above and below "normal" draft; and the scale 9 is calibrated to read directly angles of azimuth training of the camera to port and starboard of ship's head direction.

To ascertain the range and bearing of any object appearing in the reproduced picture, the conning officer, having set the controls of units 8 and 19 in accordance with the fore-and-aft trim and forward draft of the ship at the time, adjusts the unit 18 until the line X passes through the picture of the object in question and adjusts the control 7 until the said picture of the object appears centrally in the picture under the vertical azimuth marker (not shown). The scale 20 then gives the range of the object and the scale 9 its bearing relative to ship's head.

In the illustrated embodiment the controls 6 and 19 are manual. This is the preferred practical arrangement though obviously either or both could be made automatic at the cost of some increase in complexity and expenditure. It would be possible to obtain automatic adjustment of the forward draft variation compensating control 19 by using a suitably arranged manometer responsive to forward draft and similarly automatic adjustment of the trim variation compensating control 6 could be obtained by means of a suitable inclinometer responsive to fore-and-aft trim. As however, the conning officer will normally know quite accurately the forward draft and the fore-and-aft trim, it is not considered that the added complexity and cost of automatic compensation for these variables is worth while.

In the illustrated embodiment the line X which is, in effect, a range finding cursor, is electronically produced. It could, however, be replaced by a mechanically movable horizontal line cursor operated by a handle which also operated a range reading indicator. The illustrated arrangement is preferred, however, because, by producing the cursor line electronically as described, variations in the dimension of the scanning line raster in the field deflection direction will not produce range errors whereas, with a cursor which is independent of the raster, provision must be made to ensure a constant pre-determined raster if range errors are to be avoided and this, in practice, is a difficult and costly matter.

I claim:

1. Apparatus for ascertaining at least the range of an object, said apparatus comprising a television camera positioned and arranged to view a scene which includes said object, a television reproducer included with said camera in a closed circuit television system and adapted to reproduce said scene in a picture the height dimension of which corresponds to a vertical angle of view of pre-determined value, means for providing a movable cursor line extending across the reproduced picture at right angles to said height dimension, manually operated means for moving said cursor line in relation to the reproduced picture along said height dimension, means for swinging said camera in azimuth, and range indicator means actuated by said manually operated means for indicating the range of an object which appears in the picture and has been brought into co-incidence with said movable cursor line at a pre-determined point along its length.

2. Apparatus as claimed in claim 1 wherein the cursor line is movable in relation to the reproduced picture along said height dimension by two controls at least one of which is a manual control which also actuates said range indicating means and the second of which provides an additional compensating adjustment varying the relative position of said cursor line to said reproduced picture for a given setting of said one control.

3. Apparatus as claimed in claim 2 wherein both said two controls are manual controls.

4. Apparatus as claimed in claim 3 wherein the means for swinging the camera in azimuth is provided with an indicating means having a scale reading directly the horizontal angle between the direction in which the camera is pointed and the heading direction of a structure from which the camera is carried whereby when an object in the reproduced picture has been brought into coincidence with a particular point along the cursor line, the reading of said scale gives the relative bearing of said object with respect to said heading direction.

5. Apparatus as claimed in claim 4 wherein means is provided for swinging the camera in elevation and an additional indicating means having a scale is provided in association with the last said means for indicating the angle in the vertical plane between the direction in which the camera is pointed and a datum elevation, with reference to the horizontal, of a structure from which the camera is carried.

6. Apparatus as claimed in claim 5 wherein the means for producing said movable cursor line is an electronic means and the cursor line is an electronically produced line superimposed over part of the reproduced picture.

7. Apparatus as claimed in claim 6 wherein the means for producing the electronically produced movable cursor line comprise means for producing, during each television field scanning period, a saw tooth voltage wave excursion, means for producing a variable D.C. voltage, and means for modifying the intensity of one scanning line in the reproduced picture when the saw tooth voltage equals the adjusted value of the variable D.C. voltage, said one scanning line being of a given intensity and constituting said cursor line.

8. Apparatus as claimed in claim 7 wherein the variable D.C. voltage is the sum of two separately variable component D.C. voltages one of which is controlled by a first manual control which also actuates the range indicating means and the other of which provides an additional compensating voltage varying the position in the reproduced picture of the one scanning line obtained at any given setting of said first manual control.

9. Apparatus as claimed in claim 8 wherein the saw tooth voltage wave and the variable D.C. voltage are applied as inputs to a comparator the output from which, obtained when said inputs are equal, is applied as a voltage to the reproducer tube in said television reproducer through a gate means which is closed by television line pulses and opened between successive line pulses whereby said output, when it occurs, changes the intensity of one television line in the reproduced picture at a height therein determined by said D.C. voltage.

10. A conning aiding ship-board apparatus comprising a television camera mounted forward in the ship to view forwardly and in a downwardly inclined direction; means for swinging said camera in azimuth a control for said means; a scale indicator indicating the angle in azimuth between the azimuth direction in which said camera is pointed and ship's heading; second means for swinging said camera in elevation; a control for said second means; a second scale indicating the angle in elevation between the direction in which said camera is pointed and a pre-determined fore-and-aft angle of trim of the ship; a closed circuit television system including said camera and a television reproducer synchronously operated therewith; means for separating field pulses from the output from the camera; means for producing, from the separated field pulses, saw tooth voltage excursions each occupying substantially one field period; a comparator fed as to one input by the saw tooth excursions; a manually variable D.C. voltage source the control for which also operates a scale marked in range; a second manually variable D.C. voltage source the control for which also operates a scale marked in ship's draft forward relative to a pre-determined draft forward; means for applying the sum of the two variable D.C. voltages as the second input to the comparator; a gate means fed with output from said comparator; means for separating line pulses from the output from the camera and utilising said separated line pulses to close said gate when said pulses occur and open it between pulses; a signal mixer fed with output from the camera and output passed by said gate; and means for feeding the mixed output from the mixer to the television reproducer.

References Cited

UNITED STATES PATENTS

| | | | |
|---|---|---|---|
| 2,786,096 | 3/1957 | Palmer | 178—6.8 |
| 2,970,310 | 1/1961 | Bruce | 356—5 |
| 2,588,035 | 3/1952 | O'Neil | 178—7.83 |

RICHARD MURRAY, Primary Examiner

D. E. STOUT, Assistant Examiner

U.S. Cl. X.R.

343—112